United States Patent [19]
Goldberg et al.

[11] Patent Number: 5,548,113
[45] Date of Patent: Aug. 20, 1996

[54] CO-AXIAL DETECTION AND ILLUMINATION WITH SHEAR FORCE DITHERING IN A NEAR-FIELD SCANNING OPTICAL MICROSCOPE

[75] Inventors: Bennett B. Goldberg, Newtonville; Hadi F. Ghaemi, Brookline, both of Mass.

[73] Assignee: Trustees of Boston University, Boston, Mass.

[21] Appl. No.: 216,887

[22] Filed: Mar. 24, 1994

[51] Int. Cl.$^6$ .................................. H01J 3/14; H01J 5/16
[52] U.S. Cl. ........................ 250/234; 250/216; 250/306; 359/368
[58] Field of Search ..................... 250/307, 306, 250/226, 227.26, 216, 234; 359/368, 385

[56] References Cited

U.S. PATENT DOCUMENTS

| | | | |
|---|---|---|---|
| 4,604,320 | 8/1986 | Okamoto et al. | 428/423.1 |
| 4,659,429 | 4/1987 | Isaacson et al. | 430/5 |
| 4,662,747 | 5/1987 | Isaacson et al. | 359/368 |
| 4,725,727 | 2/1988 | Harder et al. | 250/227.29 |
| 4,917,462 | 4/1990 | Lewis et al. | 350/319 |
| 4,947,034 | 8/1990 | Wickramasinghe et al. | 359/368 |
| 5,004,307 | 4/1991 | Kino et al. | 359/368 |
| 5,018,865 | 5/1991 | Ferrell et al. | 250/227.11 |
| 5,081,350 | 1/1992 | Iwasaki et al. | 250/234 |
| 5,105,305 | 4/1992 | Betzig et al. | 359/368 |
| 5,214,282 | 5/1993 | Yamaguchi et al. | 250/307 |
| 5,254,854 | 10/1993 | Bedzig et al. | 250/234 |
| 5,272,330 | 12/1993 | Betzig et al. | 250/216 |
| 5,289,004 | 2/1994 | Okada et al. | 250/306 |
| 5,382,789 | 1/1995 | Aoshima | 250/216 |

OTHER PUBLICATIONS

H. Giachemi, et al., "Low Temperature Near Field Spectroscopy and Microscopy", Journal: *Ultramicroscopy*, vol. 57, pp. 165–168, Jan. 1995.

*Primary Examiner*—Stephone Allen
*Attorney, Agent, or Firm*—Baker & Botts, L.L.P.

[57] ABSTRACT

A near-field optical microscope is provided having a tip or tapered optical fiber light guide mounted directly in a hole drilled in the center of a microlens which itself is mounted in a piezoelectric tube for dithering. The tip of the tapered fiber is positioned at the front focal point of the lens. Light emanating from the region just about the tip is thus collected and collimated by the lens. A second lens, further down the optical path next focuses the beam into another fiber for transmission to a photon detection and/or spectroscopic apparatus. This second fiber can alternatively be replaced by one or more image processing lenses or a coherent fiber bundle with the light being transmitted to a position sensitive detector to provide a direct image of the tip region. The microscope also includes a shear force dithering apparatus for control of fiber tip to sample distance.

16 Claims, 3 Drawing Sheets

CO-AXIAL DETECTION AND ILLUMINATION WITH SHEAR FORCE DITHERING IN A NEAR-FIELD SCANNING OPTICAL MICROSCOPE

FIELD OF THE INVENTION

This invention relates generally to optical microscopy and more specifically to illumination, collection and shear force detection in a near-field scanning microscope.

BACKGROUND OF THE INVENTION

Microscopes employing conventional optical imaging systems are limited in their resolution capabilities. It is known that conventional optical microscopy techniques can not be used to resolve features significantly smaller than one-half the wavelength of the light used to illuminate the sample. As a result, transmission and scanning electron microscopes were developed in order to provide the ability to examine structures substantially smaller than the wavelength of visible light. In fact, technologies such as scanning tunneling microscopy (STM) have allowed the resolution of structures as small as individual atoms.

Unfortunately, these high resolution techniques suffer from the drawback that they require that the sample be placed in a vacuum and/or be subjected to ionizing radiation. This requirement has proved unsatisfactory for many types of specimens (e.g. biological materials) since considerable damage to the specimen or modification of the property to be investigated often results from observation or sample preparation. Moreover, most of these techniques employ tunnelling electrons or an electron beam as the signal source within the microscope. Thus, a sample must be generally electrically conductive in order to be observable.

In addition to these problems, microscopes based upon tunnelling electrons are unable to fulfill the requirements of researchers who wish to study the electrical or optical properties of an object. Certain features of a specimen that are detectable by optical microscopy may nevertheless be invisible to an electron microscope because the two devices measure substantially different physical properties. For example, while electron microscopes are suited quite well for examining surface topology, they are practically unusable for studying electro-optic and/or optical properties of specimens such as active semiconductor devices or biological samples. SEMs (scanning electron microscopes), TEMs (transmission electron microscopes) and STMs provide primarily structural information. These types of instruments can not adequately provide information on a specimen's optical properties such as color, reflectance, fluorescence and luminescence.

In response to these problems, near-field scanning optical microscopy (NSOM) has been developed to achieve fine resolution (well below the one-half wavelength diffraction limitation) without any resultant damage to the observed sample. NSOM is a relatively recent technology that has been employed for both the imaging and spectroscopy of materials at resolutions far below the familiar diffraction limit. NSOMs are capable of measuring a variety of optical properties associated with a sample. An NSOM generally consists of an aperture having a diameter that is smaller than an optical wavelength which is positioned in close proximity to the surface of a specimen and scanned over the desired portion of the sample. The light thus exiting the aperture is largely independent of the wavelength of the incident light. As the aperture is moved across the sample, an optical response of the specimen to the near-field is produced, and the resulting photons are detected by a remote photodetector. Conventional means are then employed to collect and assemble data such that a scanned image corresponding to the sample is produced for viewing.

NSOMs generally require some method for determining and maintaining a particular distance between the probe tip and the sample surface. This is often referred to as z-axis control. Shear force topographic imaging (dithering) has emerged as one technique for use in NSOMs. This method is sensitive, non-destructive, sample independent and provides a wide dynamic signal range for distances up to 50 nm above the sample. Typically, the tip is dithered by mounting it on a piezoelectric tube. As a result, prior art devices employing the dithering technique for z-axis control have heretofore used off-axis objectives for the collection and illumination of the tip region.

The imaging capabilities of super-resolution devices such as the NSOM are desirable in a broad range of disciplines ranging from semiconductor devices and materials to biological systems and beyond. For example, coupled with sensitive spectroscopic probes, NSOM can provide an unprecedented level of diagnostic capabilities to investigate and understand the optical and electro-optic properties of active semiconductor devices on a better than 30 nm length scale ($\lambda/20$) in the visible light region. Additionally, optical modes in optoelectronic devices can be mapped, local doping profiles can be determined and fabrication process and lattice mismatch induced strains can be ascertained.

NSOM devices further provide the ability to map photoluminescence (PL) and electro-luminescence (EL) emission at subwavelength resolution. PL can determine defect type and density relative to band edge emission by examining intensity ratios. PL wavelength shifts in band edge emission are indicative of local strain fields. EL is used to understand the behavior of active opto-electronic devices. Additionally, using NSOM in illumination-transmission mode (discussed below), single molecules can be imaged using near-field fluorescence microscopy. Site specific near-field fluorescence microscopy can provide novel information on biological systems.

Often, the aperture in NSOM devices is provided in the form of a tapered single mode optical fiber with a typical aperture of 20–200 nm. The fiber tip is placed within the near optical field of the sample. Because both the tip to sample separation and the tip aperture are a small fraction of the visible light wavelength, the resulting spatial resolution is not limited by the usual far field Rayleigh criteria of $\lambda/2$. In NSOM, the electric and magnetic fields at the sample are effectively confined to the tip diameter, and therefore can yield resolutions as high as $\lambda/40$, or about 15 nm for visible wavelengths.

NSOM devices operate primarily in one of two distinct modes. In the first possible mode, illumination mode, the excitation light is directed down the tapered optical fiber tip, and the transmitted, reflected or emitted light is collected by far-field optics. In the second mode, collection mode, the sample is excited by far-field optics, and the transmitted, reflected or emitted signal is collected in the near-field by the fiber tip. Collection mode operation is typically employed when examining semiconductor and opto-electronic systems. This is because when examining these types of samples, excitons diffuse from the excitation point prior to recombination. It is thus beneficial to use the near field resolution to collect light rather than to excite the sample. In contrast, biological systems are better suited to illumination mode, since the fluorescence emanates from localized centers.

NSOM operation can be further characterized according to directional relationship by which light is collected. In a first procedure, incident light (produced either in illumination mode or collection mode) is transmitted through the sample and collected below the stage. The collected light is directed towards a photodetector device and the image is reconstructed. This method is referred to as transmission mode and is commonly employed with transparent or semi-opaque samples such as biological specimens. Alternatively, an NSOM may operate according to a reflection mode whereby light is reflected or emitted from the sample surface and collected either in the near field (collection mode) or in the far field (illumination mode) somewhere above the sample surface.

Opaque samples require the use of reflection mode. One reflection mode technique which has been used with some degree of success has been suggested by R. D. Grober et al. ("Design and Implementation of a Low Temperature Near-Field Scanning Optical Microscope", Rev. Sci. Instr., March 1994). Grober calls for placing an optical fiber tip at the focal point of a reflecting objective. The resulting apparatus provides dispersionless optics using a microscope objective having a small primary convex mirror and a large secondary concave mirror. The mirrors are mounted on plates capable of vertical motion for focusing and collimating the luminescence. Grober has reported that he has been able to achieve a numerical aperture (NA) value of 0.4.

The Grober device, however, suffers from a number of disadvantages. Firstly, the mirroring apparatus requires a motion control separate from the typical x, y and z dimension motion controls used to move the sample platform and/or the fiber probe. As a result, the device is more costly than a non-reflecting objective based counterpart device. Moreover, the inclusion of the mirrors and their associated motion controls increases the physical dimensions of the optical system contained within the NSOM device. An assembly that is not compact in size is often impossible to incorporate within an existing conventional microscope. In addition, specialized environments such as vacuums and cryogenic chambers often can not accommodate a bulky assembly such as that required with the Grober design.

As described above, opaque specimens require the use of a reflection mode NSOM device. Heretofore, the operation of NSOMs in reflection mode has occurred almost exclusively through the use of off-axis collection objectives. One known exception is a device described in U.S. Pat. No. 4,725,727 issued to Harder et al. This patent appears to describe a generally co-axial scheme using a waveguide formed from quartz crystal. A tip is formed and two opaque layers are deposited on the tip such that, for example, an inner transparent layer may be used to illuminate the sample, with the reflected light being captured by the outer layer and delivered to photodetectors. This scheme, however, requires multiple, complicated coatings on the tip and is thus difficult to implement in practice. In addition, this scheme can not perform any imaging of the sample region about the tip to, for example, direct the tip over the sample region to be studied.

FIG. 1 illustrates a prior art near-field optical microscope operating in the reflection mode. An example of an NSOM using such an off-axis objective in a reflective geometry is the Aurora TMX2000 model built by the Topometrix Corporation located in Santa Clara, Calif. For purposes of illustration, however, a distinct prior art reflective mode NSOM is shown in FIG. 1 and is discussed herein.

As is apparent to one of ordinary skill in the art, the prior art NSOM of FIG. 1 includes a probe 10 terminating in a probe tip 70. A stage 20 is further provided for supporting sample 30. The probe may be displaced relative to the sample in the x, y and z dimensions by means of piezoelectric actuators 40. A light source 60 is employed to illuminate probe tip 70 and a photodetector 80 is provided for the detection of a change in amplitude or phase of the vibrating (dithering) tip.

Off-axis, side mounted objective lens 120 is used to image the tip region, provide illumination, or collect the reflected or emitted light from the sample as a result of illumination through probe 10 and tip 70 by way of source 60. In a typical off-axis scheme, the objective lens 120 may be mounted at a distance of approximately 10 mm from the tip 70.

Such an off-axis scheme suffers from a small collection efficiency and reduced resolution. This is because the use of an off-axis objective requires independent x, y, z controls at the off-axis objective. Because of this design, a relatively large distance between the sample 30 and objective 120 is needed. This, in turn, results in a smaller numerical aperture for collecting the reflected or emitted light resulting in decreased performance. Further, as a result of this reduced collection efficiency, scan speed is generally reduced in order to achieve a satisfactory resolution. Alternatively, if scan speed is maintained, the resolution will suffer.

In contrast, if it is possible to place the collecting device (i.e. the collection objective) in co-axial alignment with the probe tip, the collection efficiency and thus the resolution and brightness will improve dramatically. This is because a higher numerical aperture can be achieved by co-axial detection as a result of a reduction in distance between the probe tip and the collection objective. For example, this distance may be reduced by a factor of approximately five to 2 mm by using a co-axial design.

SUMMARY OF THE INVENTION

It is, therefore, an object of the present invention to provide an improved method and apparatus for performing near-field optical microscopy.

It is a further object of this invention to provide a near-field optical microscope having a high degree of collection efficiency allowing detection of low-intensity visible light while simultaneously allowing piezoelectric dithering of the probe tip for shear force imaging.

It is a still further object of the present invention to provide a co-axial collection scheme in a near-field optical microscope.

It is an even further object of the present invention to provide such a co-axial collection scheme in a compact, simple and easily manufactured form.

It is a yet further object of this invention to provide a method of detecting the light emanating from, illuminating the region about, or imaging the region about a tip in a near-field optical microscope.

It is a still further object of this invention to provide a near-field optical microscope having a relatively low cost optical system.

In accordance with the present invention, a near-field optical microscope is provided having a tip or tapered optical fiber light guide mounted directly in a hole drilled in the center of a microlens which itself is mounted in a piezoelectric tube for dithering. The tip of the tapered fiber is positioned at the front focal point of the lens. Light emanating from the region just about the tip is thus collected and collimated by the lens. A second lens, further down the optical path next focuses the beam into another fiber for transmission to a photon detection and/or spectroscopic apparatus. This second fiber can alternatively be replaced by one or more image processing lenses or a coherent fiber bundle with the light being transmitted to a position sensitive detector to provide a direct image of the tip region. The microscope also includes a shear force dithering apparatus for control of fiber tip to sample distance.

The present invention provides an efficient and compact design and method for co-axial detection and illumination of a sample region about the tip while at the same time affording the ability to dither a pulled fiber tip for shear force imaging. The device may be incorporated within an existing conventional microscope. Additionally, the device may be used in connection with specialized environments such as vacuum and cryogenic chambers.

BRIEF DESCRIPTION OF THE DRAWINGS

The foregoing and additional objects, features, and advantages of the present invention will become apparent based upon the following detailed description to be taken in conjunction with the accompanying drawings in which.

DETAILED DESCRIPTION

Figure 1:
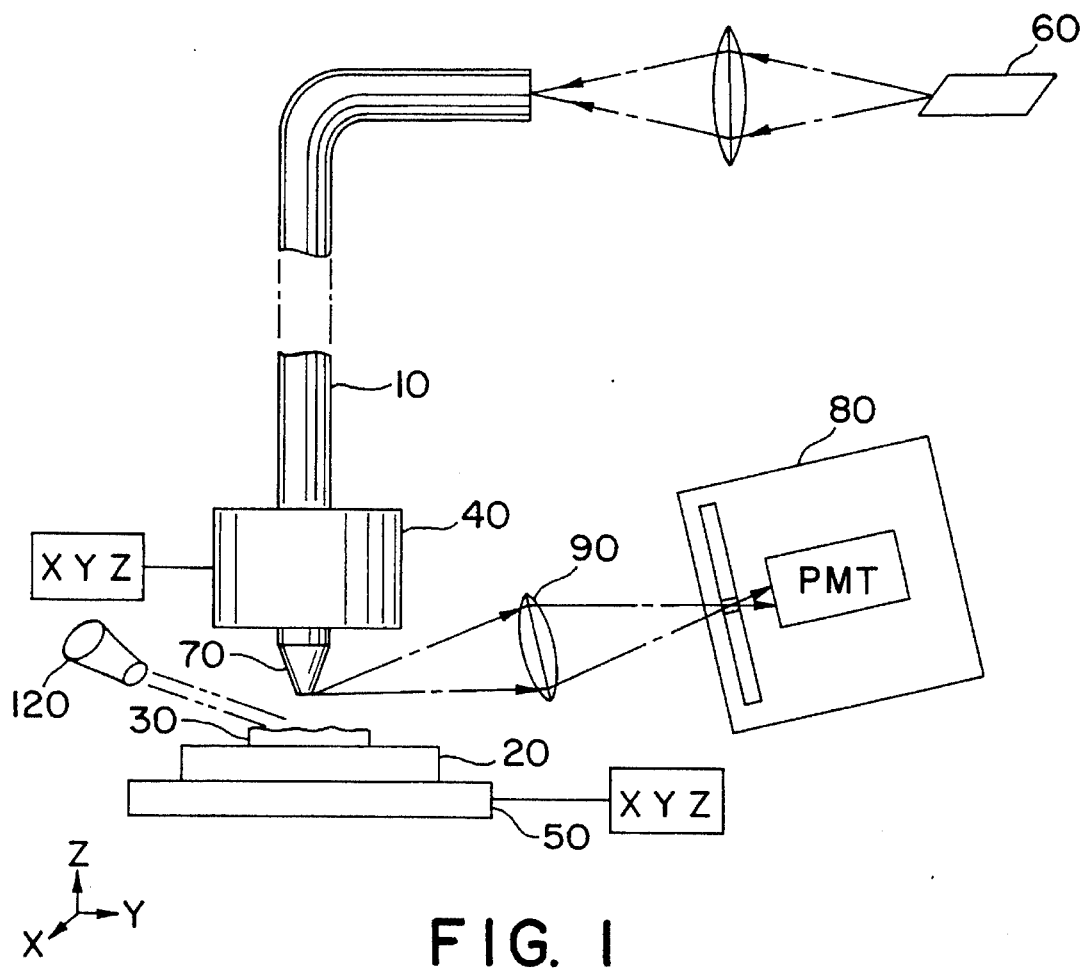
FIG. 1 is a schematic representation of a prior art near-field optical microscope operating in the reflecting mode.
Figure 2:
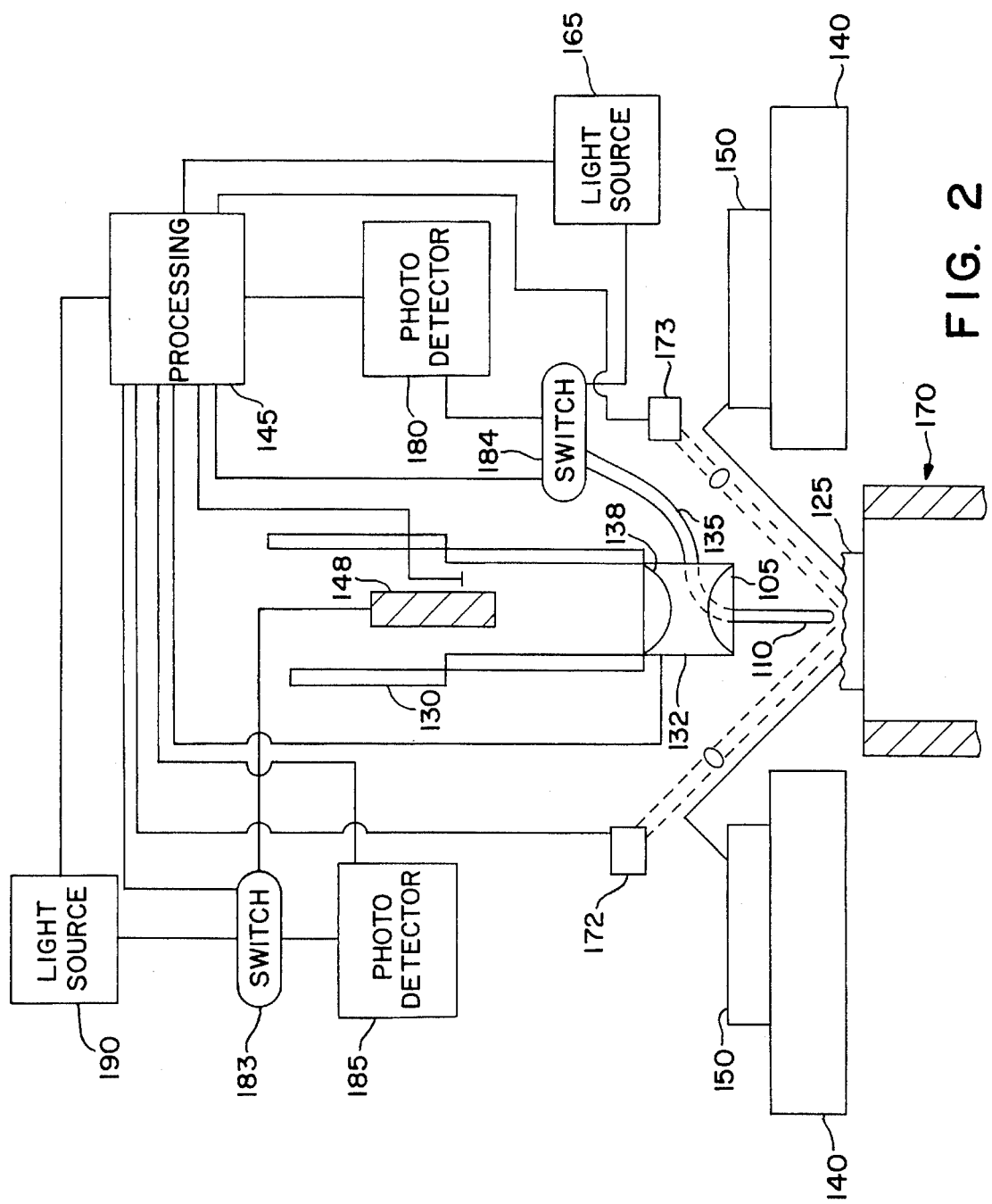
FIG. 2 is a schematic drawing of the NSOM according to this invention.

FIG. 2 illustrates an NSOM according to one embodiment of this invention. The NSOM preferably includes vibration isolation table 140 and device probes 150. Device probes 150 may be employed to, for example, provide electrical contact to opto-electronic devices or to apply potentials to biological samples. Also included is a sample motion piezoelectric 170 for moving the sample in x, y and z directions with respect to probe tip 110. Piezoelectric tube 130 may provide motion of the probe tip 110 for fine control optimization of a shear force signal. The light from light source 165 is coupled to probe 135 through switch 184 and is selectively transmitted to probe tip 110. Photodetector 180 is included for detecting light collected by probe tip 110. Switch 184 is preferably a mirror. Photodetector 180 is preferably a photomultiplier (PMT) but may be a spectrometer for wavelength dispersion and photon detection or any photodetector capable of detecting photon impingement. Collection fiber 148 is connected to light source 190 and photodetector 185 through switch 183.

The probe 135 is manufactured by heating a single-mode optical fiber to soften it, and drawing the softened fiber to form a tapered fiber. After drawing, at least a portion of the tapered portion, not including the aperture 350, is preferably coated with a reflecting opaque material such as a metal.

A long-wavelength laser diode 172 and InGaAs quadrant photodetector 173, with associated steering optics and lock-in amplifier are further provided for shear force excitation and detection. Alternatively, photodetector 173 can be any semiconductor photodetector paired with a suitable wavelength laser diode. Dithering piezoelectric 132 is employed to vibrate probe tip 110 in connection with the shear force detection mechanism as discussed below. It will be understood by one of ordinary skill in the art that such shear force detection is useful in NSOM in order to maintain the probe tip 110 at a constant, or approximately constant distance from the sample surface.

A lens objective consisting of a primary lens 105 and a secondary lens 138 are fitted within dithering piezoelectric 132. This lens objective is described in further detail below in conjunction with FIG. 3.

Figure 3A:
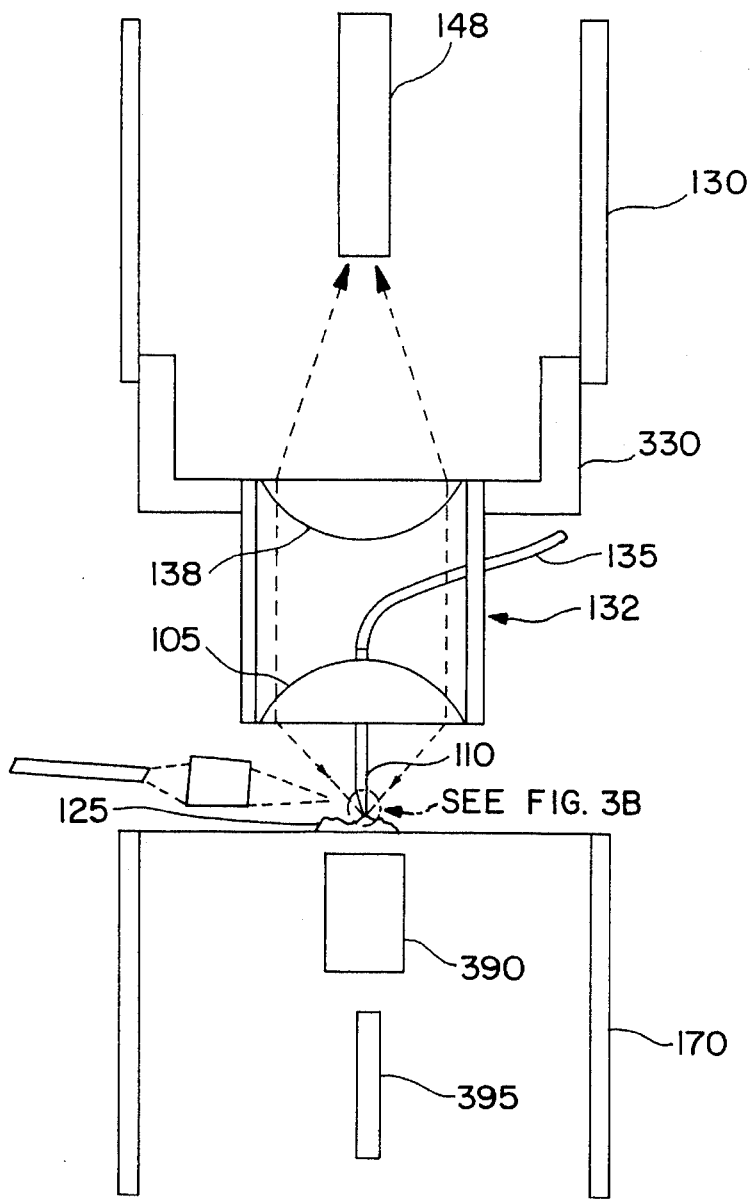
FIG. 3 is a schematic drawing of a portion of the NSOM illustrated in FIG. 2 according to one embodiment of this invention.
Figure 3B:
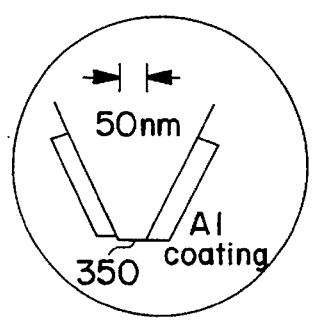

FIG. 3 illustrates a novel optical system according to one embodiment of the present invention. The probe 135, which is preferentially provided in the form of a single-mode optical fiber, is placed within dithering piezoelectric 132 and through a hole formed essentially in the center of primary lens 105. The optical fiber, as described above, is tapered and positioned with tip 110 at the front focal point of primary lens 105. Alternatively, graded index lenses (GRIN) could replace lenses 105 and 138.

In a preferred embodiment of this invention, scanning tube 130 comprises an approximately 0.5 inch long, 0.25 inch diameter, four quadrant piezoelectric tube which is used to provide fine control of probe tip position for optimizing the shear force signal. At the base of scanning tube 130, a macor piece 330 with integral secondary collection microlens 138 and an approximately 200 μm collection fiber 148 is used to mount the approximately 0.125 inch diameter dithering piezoelectric tube 132. The probe tip 110 is preferably installed through an approximately 0.013 inch hole formed in primary lens 105 affixed to the end of dithering piezoelectric 132. Probe tip 110 is drawn to provide an aperture 350 of approximately 50 nm and is preferably coated with a metal layer approximately 100 nm thick. This metal may be, for example, aluminum. The image of collection fiber 148 is focussed at the probe tip 110, preferably 0.080 inches from primary lens 105.

Reflection geometry illumination mode operation is obtained by illuminating the sample 125 through probe tip 110 and collecting the reflected and emitted light back up through primary lens 105 and secondary lens 138 into collection fiber 148. Collection fiber 148 may be selectively connected to photodetector 185 or light source 190 through switch 183. Light source 190 and light source 165 may be the same component or they may be provided separately. Collection mode operation occurs in reverse. In this case, collection fiber 148 is used to illuminate a broad area of the sample, with the probe tip 110 collecting reflected or emitted light in the near-field at the sample surface.

The microscope of this invention may alternatively be operated in transmission mode when a transparent or semi-opaque specimen is examined. For purposes of illustration, an illumination-transmission geometry is discussed although it will be understood by one of ordinary skill in the art that this invention could equally be implemented in a collection-transmission mode. In the illumination-transmission mode, light is emitted by light source 165 through probe 135 and probe tip 110. Light transmitted or emitted from the sample 125 is captured in the far field through GRIN lens 390 and into optical fiber 395. Optical fiber 395 is connected to a photodetector device as is known in the art and processing electronics (not shown) can process the image for viewing. Alternatively, a coherent optical fiber bundle may be used in place of optical fiber 395, or an objective lens may be used in place of optical fiber 395 and lens 390, in order to provide additional far field imaging capabilities.

In typical operation under illumination mode with reflection geometry, piezoelectric 170 scans the sample 125. Light collected by lens 105 and passing through lens 138 to collection fiber 148 creates the near-field optical image thus allowing probe to sample distance to be controlled by a feedback loop. Laser diode 172 and photodetector 173 of FIG. 2 are used to obtain a simultaneous shear force signal. In this way an image at constant tip to sample separation is generated. It is critical to the NSOM technique that optical data be collected in the near-field while at the same time performing the shear force detection described below. Electronics and processors 145 used to control the scan and the shear force feedback loop are readily available from various scanning probe microscopy suppliers such as Topometrix and Park Scientific.

Course vertical approach is provided by a differential screw which drives a differential spring. The spring, in turn moves a piston ground to close tolerance with a matching cylinder (not shown). In typical operation, a tip to sample separation at room temperature of 80µm (a single turn on the differential screw) changes less than 10% at low temperature. The sample 125 is preferably mounted on an approximately 2.0 inch long sample motion piezoelectric 170 which can also be used for coarse positioning of the sample 125 using the inertial motion or a slip stick technique.

The NSOM according to this invention provides a numerical aperture of approximately 0.55. This compares favorably with off-axis objective based devices such as that manufactured by Topometrix which has a numerical aperture of 0.35. Taking into account the shadowing of the central region of the light cone by the probe tip 110 which results from the use of a coaxial scheme, it is still possible to achieve a significant improvement in efficiency. Moreover, the optical system of the present invention results in a significantly smaller design. One typical off-axis technique requires 3×3×1 cubic inches to contain the detection components located off-axis. In comparison, the detector components will fit in a volume of 0.25×0.25×0.3 cubic inches through the use of the co-axial scheme of this invention.

Since the optical response is generally not representative of surface topography, an independent measure is necessary to maintain a fixed proximity (about 5 nm) between probe tip 110 and sample 125. This is accomplished by a shear-force detection mechanism whereby the probe tip 110 is dithered (vibrated) by dithering piezoelectric tube 132 at the mechanical resonant frequency of probe tip 110. This is typically 30–130 kHz. An optical beam originating at laser diode 172 and detected by InGaAs quadrant photodetector 173 operates to monitor the amplitude and/or phase of the probe tip vibration. Any tip-surface interaction quenches the resonance and shifts the resonant frequency, providing a height measurement with sub-nanometer resolution. In another embodiment, a 100 µm fiber with attached GRIN lens focusses a 1.310 µm laser from laser diode 172 onto probe tip 110. A fiber and GRIN lens pair is mounted directly opposite, collecting the shear force signal in transmission, while another pair is preferably mounted at 90° to collect in reflection. This method is preferably practices for remote or cryogenic applications.

In an additional embodiment of the invention, the lens and probe combination may be used as a top mounting scheme providing only illumination optics. This affords a simple way to illuminate the region just about the probe tip, without the use of off-axis illumination sources. This scheme could be used, for example, in conjunction with a conventional optical microscope.

While the invention has been particularly described with reference to particular embodiments thereof, it will be understood by those skilled in the art that various other changes in detail may be made therein without departing from the spirit, scope or teachings of this invention.

What is claimed is:

1. A near-field microscope for examining a sample comprising:
   an optical fiber probe having a probe tip;
   a collection fiber distinct from said optical fiber probe, said collection fiber being disposed substantially co-axially with said probe tip and a portion of said sample being scanned;
   detection means for detecting light reflected or emitted from said sample;
   a first light source coupled to said optical fiber probe and a second light source coupled to said collection fiber;
   wherein said near-field microscope may be selectively operated in either collection mode or illumination mode.

2. The near-field microscope of claim 1 wherein said optical fiber probe is disposed through an aperture in a lens, said lens being positioned co-axially with said probe tip and a portion of said sample being scanned.

3. The near-field microscope of claim 1 wherein said collection fiber is disposed above said sample and said microscope operates in reflection mode.

4. The near-field microscope of claim 1 wherein said collection fiber is disposed below said sample and said microscope operates in transmission mode.

5. A near-field scanning optical microscope for examining a sample comprising:
   an optical fiber probe having a probe tip;
   a light source;
   a first lens and a second lens, said first lens being disposed between said second lens and said staple, and said optical fiber probe and probe tip being positioned through an aperture in said first lens; and
   detection means coupled to said optical fiber probe for detecting light reflected or emitted from said sample;
   wherein said first and said second lenses collectively focus said reflected or emitted light on a collection fiber.

6. The near-field microscope of claim 5 wherein said collection fiber is connected to a photodetector for processing said reflected or transmitted light.

7. A near-field scanning optical microscope for examining a sample comprising:
   an optical fiber probe having a probe tip;
   a light source;
   at least one lens, said optical fiber probe and probe tip being positioned through an aperture in said at least one lens;
   detection means coupled to said optical fiber probe for detecting light reflected or emitted from said sample; and
   a collection fiber, said at least one lens being disposed between said collection fiber and said sample;
   wherein said collection fiber is distinct from said optical fiber probe.

8. A near field scanning optical microscope for examining a sample, comprising
   an optical fiber having a probe tip;
   at least one lens, said optical fiber probe and probe tip being positioned through an aperture in said at least one lens such that said probe tip is positioned adjacent a sample to be examined;

an optical fiber disposed opposite said at least one lens from the sample to be examined;

wherein said optical fiber probe is adapted to emit light through said probe tip and said optical fiber is adapted to receive light when operating in an illumination mode, and said optical fiber probe is adapted to receive light through said probe tip and said optical fiber is adapted to emit light when operating in a collection mode.

9. The near field microscope of claim 8 wherein said probe tip is positioned at the focal point of said lens.

10. The near field microscope of claim 9 having a first and a second lens, wherein said first lens is disposed between said second lens and said sample and said optical fiber probe and probe tip are positioned through an aperture in said first lens.

11. The near-field microscope of claim 9 wherein said optical fiber probe is coupled to a photodetector when operating in said collection mode and said optical fiber probe is coupled to a light source when operating in said illumination mode.

12. The near field microscope of claim 9 wherein said optical fiber probe is a single mode optical fiber.

13. The near-field microscope of claim 9 wherein said optical fiber is coupled to a photodetector when operating in said collection mode and said optical fiber is coupled to a light source when operating in said illumination mode.

14. The near field microscope of claim 9 further comprising means for detecting the distance between said probe tip and said sample.

15. The near field microscope of claim 14 wherein said means for detecting the distance between said probe tip and said sample comprises means for detecting shear force.

16. A near-field microscope for examining a sample, comprising:

an optical fiber probe having a probe tip;

a collection fiber distinct from said optical fiber probe, said collection fiber being disposed along an optical path with said probe tip and a portion of said sample being scanned;

detection means for detecting light reflected or emitted from said sample;

a first light source coupled to said optical fiber probe and a second light source coupled to said collection fiber;

wherein said near-field microscope may be selectively operated in either collection mode or illumination mode.

* * * * *